United States Patent
Meder et al.

(10) Patent No.: US 10,458,473 B2
(45) Date of Patent: Oct. 29, 2019

(54) CAGE SEGMENT OF A ROLLING BEARING

(71) Applicant: Schaeffler Technologies AG & Co. KG, Herzogenaurach (DE)

(72) Inventors: Christoph Meder, Sulzfeld (DE); Michael Bernutz, Nuremberg (DE); Hermann Geyer, Vestenbergsgreuth (DE); Reinhard Rumpel, Rottendorf (DE); Jurgen Lechner, Dachsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/766,518

(22) PCT Filed: Aug. 22, 2016

(86) PCT No.: PCT/DE2016/200390
§ 371 (c)(1),
(2) Date: Apr. 6, 2018

(87) PCT Pub. No.: WO2017/059850
PCT Pub. Date: Apr. 13, 2017

(65) Prior Publication Data
US 2018/0291959 A1    Oct. 11, 2018

(30) Foreign Application Priority Data

Oct. 6, 2015   (DE) .......................... 10 2015 219 277

(51) Int. Cl.
*F16C 33/36* (2006.01)
*F16C 33/46* (2006.01)
(Continued)

(52) U.S. Cl.
CPC ........ *F16C 33/513* (2013.01); *F16C 33/4605* (2013.01); *F16C 19/364* (2013.01)

(58) Field of Classification Search
CPC ... F16C 19/364; F16C 33/4605; F16C 33/513
See application file for complete search history.

(56) References Cited

U.S. PATENT DOCUMENTS 821,882 A * 5/1906 Perkins .................... F16C 19/40
384/553
8,414,193 B2 4/2013 Grull et al.
(Continued)

FOREIGN PATENT DOCUMENTS

DE         1026577          3/1958
DE         3246348 A1 *     6/1984  .............. F16C 19/30
(Continued)

*Primary Examiner* — Phillip A Johnson
(74) *Attorney, Agent, or Firm* — Volpe and Koenig, P.C.

(57) ABSTRACT

A cage segment of a rolling bearing, which cage segment has two side plates and two webs which are fixedly connected to one another, wherein the webs extend parallel to the axis of rotation of the rolling bodies of the rolling bearing, and in which cage segment the side plates and the webs form a pocket for receiving a rolling body. In order to be able to produce and assemble a cage segment of said type in an inexpensive manner, and in order to be able to ensure operation without jamming in an associated rolling bearing, it is provided that the two side plates on both sides of the pocket extend in a circumferential direction of the rolling bearing to such an extent that the side plates together with in each case one of the two webs form in each case one half-pocket for receiving a directly adjacent rolling body.

17 Claims, 7 Drawing Sheets

(51) Int. Cl.
*F16C 33/51* (2006.01)
*F16C 19/36* (2006.01)

(56) References Cited

U.S. PATENT DOCUMENTS

| | | |
|---|---|---|
| 9,366,293 B2 | 6/2016 | Gessendorfer et al. |
| 2013/0223780 A1 | 8/2013 | Mangold et al. |
| 2016/0069389 A1 | 3/2016 | Bell et al. |
| 2016/0245339 A1 | 8/2016 | Fujiwara et al. |

FOREIGN PATENT DOCUMENTS

| | | | | |
|---|---|---|---|---|
| DE | 102005059516 | | 6/2007 | |
| DE | 102009016017 | | 10/2010 | |
| DE | 102009037422 | | 2/2011 | |
| DE | 102011087864 | | 9/2012 | |
| DE | 102012223316 | | 5/2014 | |
| DE | 102013207301 | | 10/2014 | |
| DE | 102013220833 | | 4/2015 | |
| DE | 102014220649 A1 * | 4/2016 | ............ F16C 43/065 |
| DE | 102015200381 | | 7/2016 | |
| DE | 102015206533 | | 10/2016 | |
| DE | 102016207034 A1 * | 10/2017 | ............ F16C 33/502 |
| EP | 2264325 | | 12/2010 | |
| JP | 2010144794 | | 7/2010 | |
| JP | 2013228064 | | 11/2013 | |
| JP | 2015021550 | | 2/2015 | |
| JP | 201575190 | | 4/2015 | |
| JP | 2015175457 | | 10/2015 | |
| WO | 2011018491 | | 2/2011 | |
| WO | 2012076583 | | 6/2012 | |
| WO | 2015119888 | | 8/2015 | |

* cited by examiner

US 10,458,473 B2

CAGE SEGMENT OF A ROLLING BEARING

BACKGROUND

The invention relates to a cage segment of a rolling bearing that has two side plates and two connecting pieces that are connected rigidly to each other, wherein the connecting pieces extend parallel to the axis of rotation of the rolling bodies of the rolling bearing and in which the side plates and also the connecting pieces form a pocket for holding a rolling body.

Rolling bearings typically are formed of an inner ring, an outer ring, and multiple rolling bodies arranged between these raceways. To achieve a uniform arrangement of the rolling bodies on the circumference of the rolling bearing necessary for a uniform load distribution and to prevent contact of the rolling bodies with each other, the rolling bodies are usually guided in a bearing cage. For large rolling bearings that are used, e.g., in rolling mills and in wind turbines, the bearing cages are often constructed as bolt cages or as window cages. A bolt cage consists of two closed side rings and multiple bolts arranged between the side rings uniformly on the circumference. A rolling body provided with a central bearing hole is supported so that it can rotate on the bolt. A window cage likewise has two closed side rings and multiple axial connecting pieces arranged between the side rings uniformly on the circumference. The side rings and the axial connecting pieces enclose multiple intermediate spaces usually called windows or pockets, in each of which a rolling body is guided. Depending on the structure and function of the rolling bearing, the rolling bodies can be cylindrical rollers, tapered rollers, or spherical rollers.

Deviating from the closed design, a window cage can also be formed from cage segments that are either connected to each other or are in contact with each other at least in the circumferential direction of the cage. In addition, cage segments are also known that are arranged as separating and guiding elements between the rolling bodies without coming in contact with each other.

From DE 10 2009 016 017 B4, a cage segment reduced to a separating and guiding element in a rolling bearing is known, which has two axially outer, fork-shaped guide bodies with concave thrust surfaces that are connected to each other by a flat axial connecting piece oriented in the radial direction. In the assembled state of the relevant rolling bearing, the cage segments are arranged between two rolling bodies with respect to the circumference and are guided with the base of the guide bodies on the raceway of the inner ring.

In DE 10 2012 223 316 B3, a similar cage segment of a rolling bearing is described that has, in addition to the fork-shaped guide bodies, two side plates partially engaging the two rolling bodies on the end side. The side plates are connected to each other by the axial connecting piece but are not in contact with the side plates of the adjacent cage segments on the circumference. The side plates are used for the lateral guidance of the relevant cage segment by the rolling bodies guided in one of the raceways in side rims and have, on their radial edges, a bulging for the sliding guidance on the raceways of the rings.

In contrast, in DE 10 2011 087 864 A1, a box-shaped cage segment of a rolling bearing is disclosed in which two axial connecting pieces provided with fork-shaped guide bodies are connected to each other by a circumferential connecting piece on the end side. In the assembled state of the relevant rolling bearing, there is a rolling body within the cage segment and two additional rolling bodies on the circumference of the rolling bearing on the outside on one of the axial connecting pieces of the cage segment. In the relevant rolling bearings there are thus rolling bodies guided within a cage segment and rolling bodies guided freely between two cage segments on the end side arranged alternately on the circumference.

For rolling bearings with the specified cage segments, the packing density of the rolling bodies in the rolling bearing is limited by the arrangement of the guide bodies on the axial connecting pieces and is, e.g., less than for corresponding rolling bearings with bolt cages. In addition, such rolling bearings can result in local compacting of rolling bodies and cage segments due to the lack of support of the cage segments in the circumferential direction of the rolling bearing, wherein this compacting can build up and fade away alternately and can lead to increased wear on the contact surfaces between the rolling bodies and the cage segments.

In contrast, from DE 10 2013 207 301 A1 and DE 10 2013 220 833 A1, cage segments of rolling bearings are known, each of which has two side plates that engage the two rolling bodies on the end side approximately half-way and are connected to each other by means of a flat axial connecting piece oriented in the radial direction. On the axial connecting piece of each cage segment there are guide bodies with thrust surfaces for guiding the allocated rolling body. While the cage segment according to DE 10 2013 207 301 A1 has guide fingers arranged on the axial connecting piece and provided with outer sliding bodies for the radial guidance, in the cage segment according to DE 10 2013 220 833 A1, the side plates are provided with radially outer bulges or contact elements. By the arrangement of the thrust bodies on the axial connecting pieces, the circumferential packing density of the rolling bodies is also limited for rolling bearings that are provided with these designs of cage segments. However, because the cage segments are in contact with the adjacent cage segments in the assembled state of the relevant rolling bearing by the end surfaces pointing in the circumferential direction of the rolling bearing, a uniform distribution of the rolling bodies across the circumference is guaranteed for the corresponding rolling bearings.

In contrast, in the not previously published DE 10 2015 200 381 A1, a cage segment similar to the cage segment according to DE 10 2013 220 833 A1 for a rolling bearing is proposed, in which the side plates are connected to each other by two radially staggered round bolts. The axial connecting pieces constructed in this way are used, on one hand, for connecting the two side plates and, on the other hand, for guiding the two allocated rolling bodies. Due to the free intermediate space between the round bolts, a rolling bearing equipped with such cage segments has an increased packing density of the rolling bodies and thus a higher load rating. Due to the relatively large contact surfaces between the round bolts and the rolling bodies, however, an unfavorably high rolling resistance and increased wear can be produced.

In addition, from the not previously published DE 10 2015 206 533 A1, a cage for a rolling bearing according to the class is known that is assembled from a plurality of one pocket segments, wherein each of these one pocket segments holds one rolling body. Such a one pocket segment includes two side plates arranged parallel to each other and two plate-shaped connecting pieces oriented parallel to the longitudinal axis of the respective rolling body, wherein the side plates and the connecting pieces are connected rigidly to each other. On the surfaces of the side plates pointing toward each other there are contact elements for the end-side contacting of the respective rolling bodies and the plate-shaped connecting pieces each have projections that are directed in the circumferential direction of the cage and on which radial thrust surfaces are formed for the respective rolling bodies.

Finally, from the publications DE 10 2009 037 422 A1 and EP 2 264 325 A1, segments each with 4 pockets are known for a segmented rolling bearing cage, from DE 10 26 577 A1, cage segments each with two pockets, and from WO 2012 076 583 A1, cage segments each with one pocket.

For the known segmented rolling bearing cages, it is to be stated that the fewer rolling bodies can be arranged in a cage segment, the larger the number of cage parts that are needed for building a whole rolling bearing cage. This has a disadvantageous effect on the production costs, the bearing support, the transport, and the cage assembly. Indeed, for multi-pocket cage segments, that is, for example, a cage segment with four pockets, this disadvantage is considerably reduced relative to a one pocket cage, therefore with an increasing number of pockets, the tendency of the rolling bodies and the cage segments to become jammed in the rolling bearing increases. It must also be noted that the more pockets a cage segment has, the higher the impact energy is with which such a cage segment filled with rolling bodies can impact a directly adjacent cage segment during operation if a circumferential play is overcome. In this way, the cage wear is comparatively high for cage segments with many pockets. Finally, especially with large rolling bearings, for example, with a diameter of more than 0.5 meters, each cage segment becomes heavier and thus less easy to transport and assemble the more pockets such a cage segment has.

SUMMARY

In light of this background, the invention is based on the objective of providing a cage segment of a rolling bearing of the type specified above, with which a rolling bearing with low rolling resistance and simultaneously high packing density of the rolling bodies can be realized. In addition, it should be possible to economically produce, easily store, transport, and install such a cage segment. Finally, a cage built from such cage segments shall be described for a rolling bearing.

This objective is achieved by a cage segment with one or more features of the invention as well as a cage built from cage segments for a rolling bearing. Advantageous refinements are specified below and in the claims.

Accordingly, the invention relates to a cage segment of a rolling bearing, which has two side plates and two connecting pieces that are connected rigidly to each other, wherein the connecting pieces extend parallel to the axis of rotation of the rolling bodies of the rolling bearing, and in which the side plates and the connecting pieces form a pocket for holding a rolling body. To achieve the stated objective, it is provided in this cage segment that the two side plates extend on both sides of the pocket in the circumferential direction of the rolling bearing with a free protruding length $R_L > \frac{1}{2} WK_D$ so far that these form together, with each of the two connecting pieces, a half pocket for holding a directly adjacent rolling body, wherein $WK_D$ corresponds to the diameter of a rolling body inserted into the half pocket.

This cage segment can be used for forming cages that are used, e.g., in cylindrical roller bearings, tapered roller bearings, and spherical roller bearings. Because a cage segment formed according to the invention can hold and guide more than only one rolling body and it is simultaneously shorter, with respect to its dimensions in the circumferential direction of the rolling bearing, than a cage segment according to the class with three and more whole pockets, this is comparatively easy to handle especially for the installation of large rolling bearings.

In comparison with a segment cage that is built from multiple cage segments each with only one pocket for holding only one rolling body, with a cage segment built according to the invention, the number of cage segments needed in a rolling bearing can be halved. In addition, a cage of a rolling bearing built with the cage segments according to the invention enables a higher load rating for this rolling bearing, because in comparison with cage segments that have only whole pockets, a higher number of rolling bodies can be installed in a rolling bearing according to the invention.

Moreover, the proposed construction of the cage segment can provide pocket clearance in the axial and also circumferential direction of the rolling bearing in each pocket and half pocket of the cage segment according to the invention in a simple way. This guarantees jam-free operation of a cage built with such cage segments in a rolling bearing. Not an insignificant contribution here is that the rolling bodies inserted into the two half pockets of the cage segment are indeed guided in the axial direction on their end sides, but only on one side viewed in the circumferential direction of the rolling bearing. In addition, the cage segment according to the invention can move freely in all operating situations of the rolling bearing in the area of the axial clearance and the radial clearance, so that a small amount of friction develops on this rolling bearing and on the associated rolling bodies and therefore low wear is to be expected.

According to the invention, the cage segment is formed of a metallic material and can be assembled rigidly from multiple individual parts or also can be produced as one piece by forming the cage segments, e.g., by a casting process, sintering, powder bed manufacturing, or injection molding. Because the known metallic materials from which cages are typically manufactured have the same or approximately the same heat expansion coefficients in comparison with the other rolling bearing components produced from steel, special measures known to someone skilled in the art for compensating for different heat expansion coefficients between the cage and the other bearing components can be omitted even in large rolling bearings with a diameter >0.5 meters.

The structural design of the cage segment according to the invention allows no or only very little final clearance in the circumferential direction of a rolling bearing built from these cage segments, because in comparison with cage segments with only one pocket, the number of cage segments needed for building a rolling bearing cage is significantly reduced, so that also the total of the production tolerances is smaller.

Another advantage of the cage segment built according to the invention is that this indeed holds and guides more than only one rolling body, but nevertheless has a comparatively low total mass. This is especially advantageous because cage segments assembled into a whole cage have a low, but not negligible play in the circumferential direction of the rolling bearing relative to each other. This play occurs between the end sides of the directly adjacent cage segments. During the operation of such a rolling bearing, relative movements and impacts of two directly adjacent cage segments occur, which have more kinetic energy if such a cage segment has more pockets and more rolling bodies. In this respect, the cage segment provided here with its single whole pocket and its two half pockets represents an optimal compromise between cage segments with only one pocket and those with two or more pockets.

Because the end sides pointing in the circumferential direction of the rolling bearing are constructed so that they form contact surfaces for contact on the end surfaces of the directly adjacent cage segments, together with the free protruding length $R_L > \frac{1}{2} WK_D$ of the side plates limiting the half pockets in the axial direction, it is guaranteed that the rolling bodies arranged in the cage segment can move freely in all operating situations in the scope of the pocket clearance and the jamming of these bodies is therefore prevented.

The structural design of the cage segment according to the invention with its two end-side half pockets also leads to the result that only one rolling body is always held in a whole pocket, while two other rolling bodies are surrounded halfway by one half pocket of this cage segment and a second half pocket of a directly adjacent cage segment. In this way, the cage segments of a rolling bearing are also chained to each other by the rolling bodies, which is evaluated to be very advantageous in comparison with conventional cage segments with only one pocket or with multiple whole pockets.

According to the invention, it is therefore provided preferably that several of these cage segments are arranged one directly after the other for forming a rolling bearing cage in the circumferential direction of the rolling bearing, wherein the two half pockets form a whole pocket together with adjacent half pockets of the directly adjacent cage segments. Accordingly, every second rolling body is held in a pocket formed in one piece and the two rolling bodies arranged directly adjacent to it are held in a two-part pocket formed of two half pockets.

So that such cage segments can be guided with low friction in a rolling bearing, one refinement of the invention provides that the side plates of the cage segment have radially outward and/or radially inward projecting guide elements that are constructed as rounded sliding surfaces and are used for supporting the cage segment on a ring surface of an inner ring and/or a ring surface of an outer ring of the rolling bearing. These radial guide elements are preferably formed on the ends of the side plates pointing in the circumferential direction of the rolling bearing.

To promote good lubrication of the rolling bodies arranged in the pockets and half pockets of the cage segment, it can be provided that the side plates and/or the connecting pieces have lubricant feeds formed as holes or radial recesses, wherein the side plates have at least one of these holes in the area of two end-side free legs of the half pockets.

According to another embodiment, it can be provided that the wall thickness of the connecting pieces is smaller than the wall thickness of the side plates. In this way, the side plates are optimally prepared for absorbing the impact forces that occur during impacts between adjacent cage segments, while the comparatively thin connecting pieces keep the use of materials and the mass of the respective cage segment low.

The cage segment according to the invention is constructed for its use in a cylindrical roller bearing, tapered roller bearing, or cylindrical roller bearing so that its two side plates, viewed in the circumferential direction of the rolling bearing, have a greater extent than in the radial direction of the rolling bearing.

If the cage segment according to the invention is to be used for building a needle bearing cage, it is provided that its two side plates, viewed in the radial direction of the rolling bearing, have a larger extent than in the circumferential direction of the rolling bearing.

If the cage segment according to the invention is provided so that a component of a cage is to be used for a tapered roller bearing, then according to one embodiment it is provided that the pocket and the two half pockets of the cage segment are constructed for holding a tapered roller of the tapered roller bearing and have an equal-sided, trapezoidal geometry.

Another improvement of the cage segment according to the invention consists in that the dimensions of the pocket and also of the two half pockets are such that the rolling bodies are arranged there with pocket clearance. This pocket clearance has a component directed in the axial direction and a component directed in the circumferential direction of the allocated rolling bearing.

For the exact and low-friction guidance of the rolling bodies in the pocket and the two half pockets of the cage segment according to the invention, according to another embodiment, this has, on the pocket-side and/or half pocket-side surfaces of the side plates and/or the connecting pieces, axially protruding projections with end-side contact surfaces for the rolling bodies to be held in the respective pocket or half pockets.

The projections on the pocket-side and/or half pocket-side surfaces of the side plates and/or the connecting pieces have identical or differing extents depending on the geometry and the provided pocket clearance in the respective pocket and the two half pockets. In addition, these projections can be arranged for optimizing the alignment of the rolling bodies in the allocated pockets or half pockets with respect to the opposing surface of the cage segment at different positions.

A cage segment with the features of the invention can be characterized for the design of a cage of a tapered roller bearing such that the two half pockets of the cage segment have an essentially U-shaped geometry in the radial view, wherein two directly adjacent half pockets of two directly adjacent cage segments are formed for holding a tapered roller of a tapered roller bearing and in which the two U-legs of the first side plate are longer than the two U-legs of the second side plate. In this way, it is taken into account structurally in the cage segment that the tapered roller bodies of a tapered roller bearing have different diameters at their axial ends.

In a cage segment that is formed according to the features of the invention and is guided on the raceways of the bearing rings of a rolling bearing and therefore no radial guide elements are needed on the two side plates, it is provided according to an embodiment that the connecting pieces have, on their radial ends, at least one radially projecting guide surface and that the radial distance of two radially opposite guide surfaces is the same size or somewhat smaller than the diameter of the rolling bodies held in the cage segment, so that the respective cage segment is guided radially by its guide surfaces on the raceway of the inner ring and/or the raceway of the outer ring of the rolling bearing. In this construction, the side plates of the cage segment do not contact the two bearing rings of the rolling bearing, as still to be explained in more detail with reference to an embodiment.

Finally, the invention also relates to a cage of a rolling bearing that is built from the cage segments according to the invention and includes a plurality of cage segments with at least a few of the specified features, wherein the rolling bearing has an outer ring arranged coaxially above an inner ring and also rolling bodies arranged radially in between, wherein a rolling body is held in a pocket of a cage segment, wherein directly adjacent rolling bodies are held in two half pockets of two directly adjacent cage segments, and in which the cage segments are arranged one directly after the other viewed in the circumferential direction of the rolling bearing and contact each other on their end sides pointing in the circumferential direction of the rolling bearing.

BRIEF DESCRIPTION OF THE DRAWINGS

For further illustrating the invention, the description of a drawing of two embodiments is included. Shown in this drawing are.

DETAILED DESCRIPTION

Figure 1:
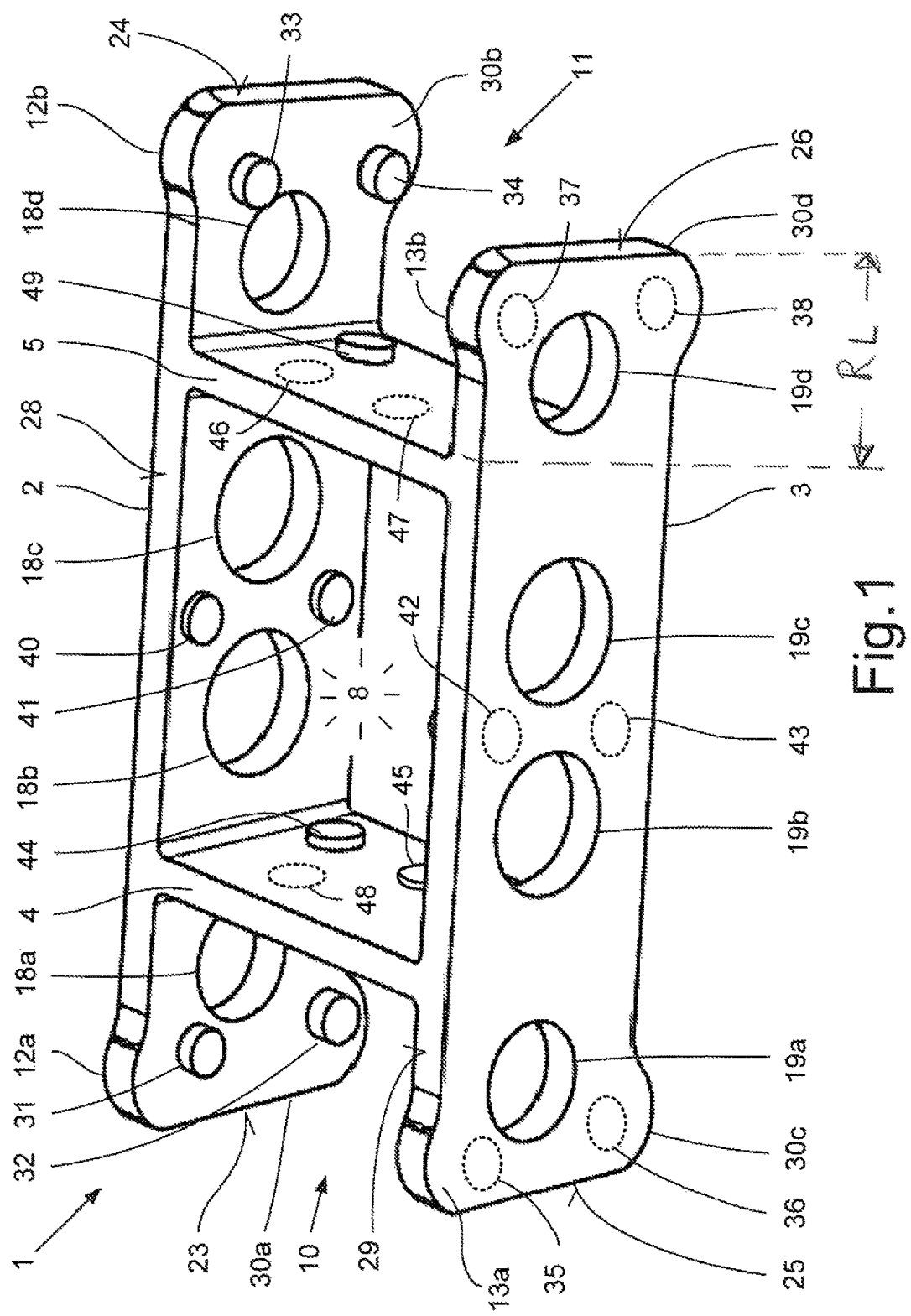
FIG. 1 a perspective view of a cage segment according to the invention for forming a cage for a rolling bearing according to a first embodiment, FIG. 2 the cage segment according to FIG. 1 in a radial plan view, FIG. 3 the cage segment according to FIGS. 1 and 2 filled with three tapered sectional rolling bodies in a radial plan view, FIG. 4 the cage segment according to FIG. 3 in a perspective view, FIG. 5 a perspective view of a tapered roller bearing with removed outer ring with a view of four cage segments arranged one after the other, FIG. 6 an end-side view of the rolling bearing according to FIG. 5 with outer ring placed on top, FIG. 7 two cage segments according to FIGS. 1 to 4 inserted in a circumferential section of a tapered roller bearing in perspective view, FIG. 8 a perspective view of a cage segment according to the invention for forming a cage for a rolling bearing according to a second embodiment, FIG. 9 the radial bottom side of the cage segment according to FIG. 8 filled with three tapered sectional rolling bodies, FIG. 10 the cage segment according to FIGS. 8 and 9 filled with three tapered sectional rolling bodies in an end-side view, FIG. 11 an axial section through a cage segment according to FIGS. 8 to 10 with a view of a pocket surface pointing in the circumferential direction of the rolling bearing, and FIG. 12 a radial section through the cage segment filled with rolling bodies according to FIGS. 8 to 11 with a view of the pocket surface of a side plate.

Accordingly, a first embodiment of the cage segment 1 according to the invention is shown in FIGS. 1 to 7 in various views and installation situations. The cage segments 1 shown there are guided radially on ring surfaces of the bearing rings of a rolling bearing at a distance from the raceways. FIGS. 8 to 12 show a second embodiment of a cage segment 1* with the features of the invention. This cage segment 1* is guided on the raceways of the specified bearing rings.

The cage segment 1 according to FIGS. 1 to 7 consists of two side plates 2, 3 and two connecting pieces 4, 5, wherein the side plates 2, 3 and the connecting pieces 4, 5 are connected rigidly to each other. The shown embodiment is a cage segment 1 that is produced from steel in a casting process. This cage segment 1 is used for building a cage 22 for a large rolling bearing with a diameter greater than 0.5 meters. Such a cage 22 is used, as is known, for holding and guiding tapered rolling bodies 7, 7', 7", 20 of the rolling bearing 21 formed as a tapered roller bearing.

Figure 2:
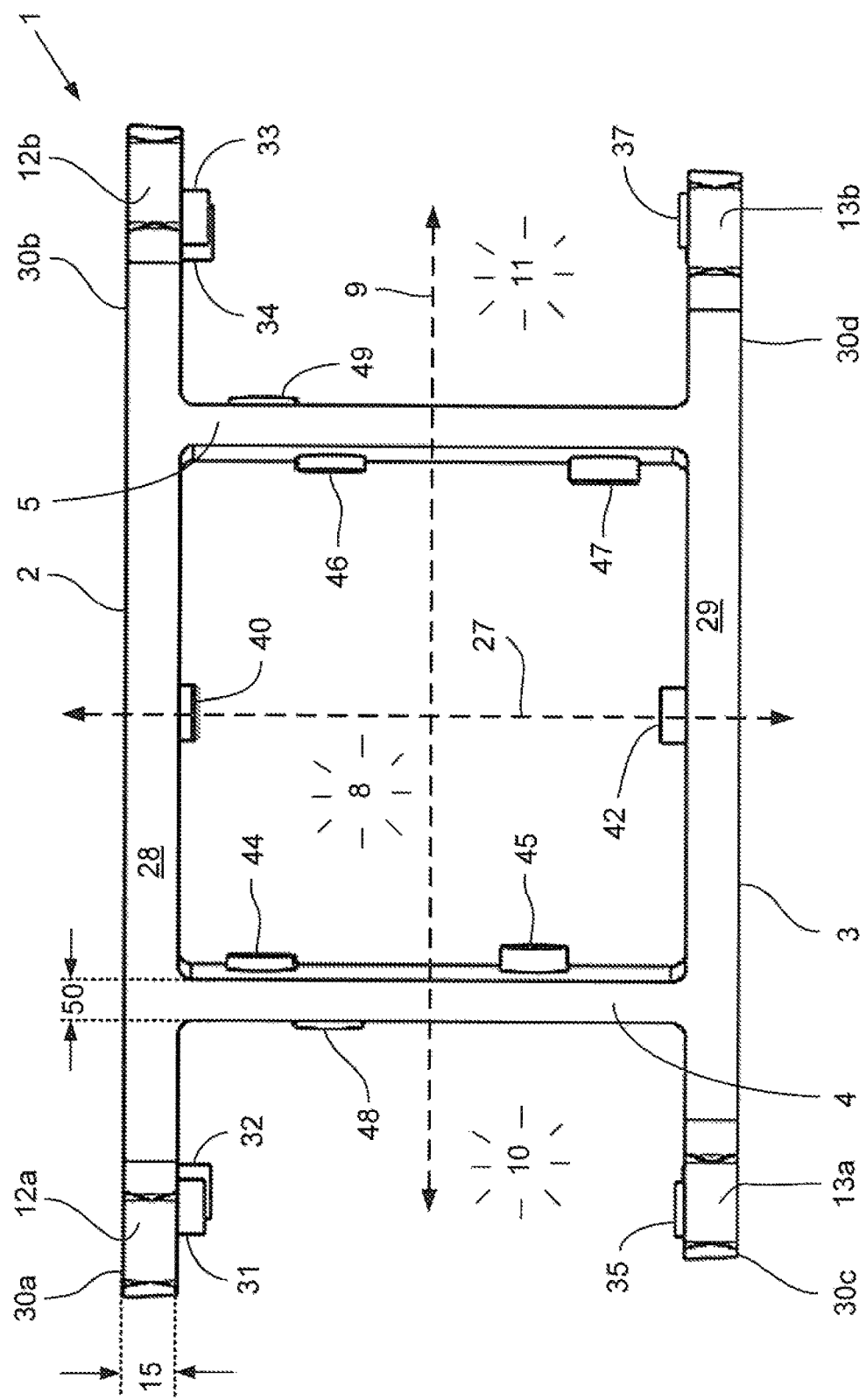

As shown particularly in FIGS. 1 and 2, the two side plates 2, 3 and the similarly plate-shaped connecting pieces 4, 5 form or bound a pocket 8 that is open radially on two sides and in which a rolling body 7 formed as a tapered roller 20 can be inserted. Viewed in the circumferential direction 9 of the rolling bearing 21, directly next to the pocket 8 on the cage segment 1 there are two half pockets 10, 11 that have an approximately U-shaped geometry in a radial plan view. The only two connecting pieces 4, 5 of the cage segment 1 form, on one side, a border pointing in the axial direction 9 of the rolling bearing 21 for the single whole pocket 8 and also a similar border for the two half pockets 10, 11. The half pockets 10, 11 are here also formed by legs 30a, 30b; 30c, 30d of the two side plates 2, 3 pointing in the circumferential direction 9 of the rolling bearing 21. These legs 30a, 30b; 30c, 30d of the two side plates 2, 3 have a free protruding length $R_L$ that is greater than the rolling body diameter $WK_D$ of the respective rolling bodies 7', 7" held by the half pockets 10, 11 for realizing pocket clearance in the circumferential direction with respect to the respective connecting pieces 4, 5. In this connection it is noted that for a cylindrical roller bearing with cylindrical roller bodies, a rolling body diameter $WK_D$ is understood to be the average rolling body diameter and for a tapered roller bearing with tapered rolling bodies, it is understood to be the respective rolling body diameters $WK_{D1}$ and $WK_{D2}$ on the axial ends of the tapered rolling bodies, wherein, in the context of this application, $WK_{D1}$ is always the larger diameter and $WK_{D2}$ is always the smaller diameter of a tapered roller. Because the cage segments 1 according to FIGS. 1 and 2 show cage segments 1 for holding tapered rollers 20 and for tapered rollers 7', 7" inserted in the half pockets 10, 11 (FIG. 3), the axial ends of these tapered rollers 7', 7" with the rolling body diameter $WK_{D1}$ are directly opposite the legs 30a, 30b and the axial ends of these tapered rollers 7', 7" with the rolling body diameter $WK_{D2}$ are directly opposite the legs 30c, 30d, in comparison with the free protruding lengths $R_{L2}$ of the legs 30c, 30d, the free protruding lengths $R_{L1}$ of the legs 30a, 30b have a longer construction in the circumferential direction.

The side plates 2, 3 have holes acting as lubricant feeds, of which holes 18a, 18d; 19a, 19d are formed in the area of the legs 30a, 30b; 30c, 30d forming the half pockets. Two additional holes 18b, 18c; 19b, 19c are formed in the two side plates 2, 3 in the area of the whole pocket 8. The two side plates 2, 3 also have, on their radial end sides, radial recesses, of which only the recesses 28, 29 pointing radially outward are designed with reference symbols.

As FIG. 2 shows, the two side plates 2, 3 have a wall thickness 15 that is greater than the wall thickness 50 of the two connecting pieces 4, 5. Here, the cage segment 1 has a comparatively stable design in the circumferential direction of the rolling bearing 1 or cage 22 assembled from these cage segments 1, so that any impacts of two directly adjacent cage segments 1, 1', 1" do not cause damage.

In addition, in the area of the two axial ends of the side plates 2, 3 there are both radially outer and also radially inner guide elements, of which only the radially outer guide elements 12a, 12b; 13a, 13b are provided with reference symbols. These guide elements 12a, 12b; 13a, 13b have guide surfaces on their free radial ends, with which the two side plates 2, 3 are guided on an allocated ring surface 39a, 39c on the inner ring 16 and also on an allocated ring surface 39b, 39d on the outer ring 17 of the rolling bearing 21. Here, the two ring surfaces 39a, 39c of the inner ring 16 are formed on the radial outer sides of two axially opposite rims 60, 62 formed next to the raceway 14a of the inner ring 16.

The two ring surfaces 39b, 39d on the outer ring 17 are formed by two axial extensions 61, 63 of the raceway 14b in this location for the rolling bodies 7.

Due to the preferably convex bulging of the guide surfaces of the guide elements 12a, 12b; 13a, 13b, a somewhat lens-shaped contact geometry is produced in interaction with the ring surface 39a, 39b on the inner ring 16 or outer ring 17, with which the respective side plates 2, 3 contact the bearing rings 16, 17, which causes very low wear on the specified components.

The side plates 2, 3 and the connecting pieces 4, 5 have, in the area of the whole pocket 8 on its pocket-side surfaces, pocket-side projections 40, 41, 42, 43, 44, 45, 46, 47 that have a contact surface on their free ends. Also, on the free legs 30a, 30b; 30c, 30d of the two side plates 2, 3, on their pocket-side surfaces, there are half pocket-side projections 31, 32, 33, 34, 35, 36, 37, 38 with end-side contact surfaces. Other such projections 48, 49 are present on the half pocket-side surfaces of the two connecting pieces 4, 5. On the contact surfaces of the specific projections, rolling bodies 7, 7', 7" arranged in the whole pocket 8 or in the two half pockets 10, 11 are contact and be supported there. The number, arrangement, and actual design of the projections, as well as their contact surfaces, are selected by someone skilled in the art as a function of the geometry of the pocket 8 and the two half pockets 10, 11, the bearing type, and the desired pocket clearance.

Figure 5:
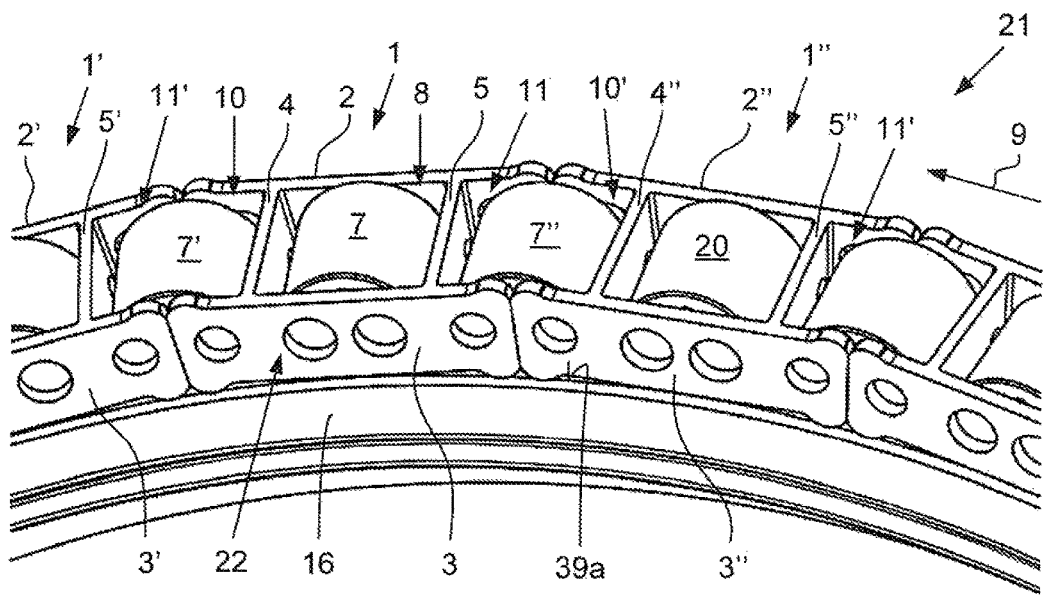
Figure 6:
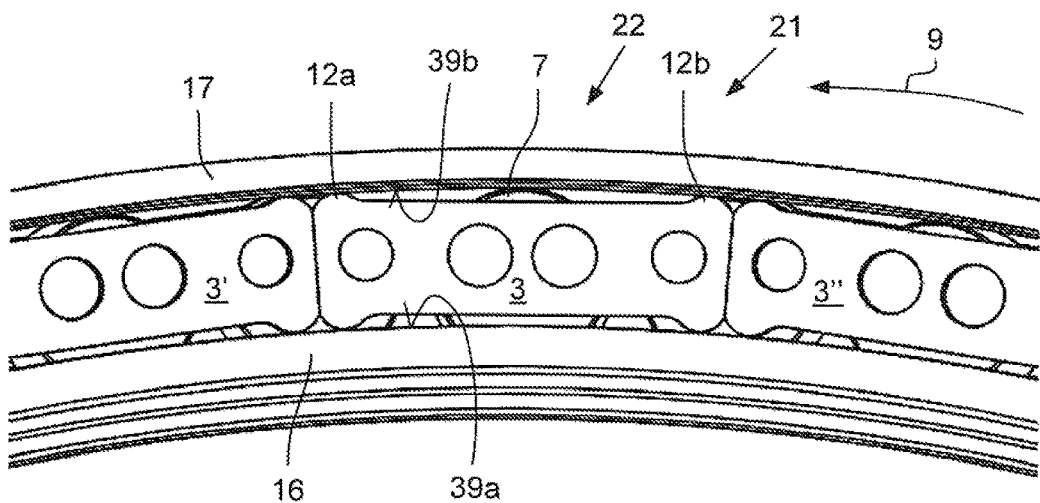
Figure 7:
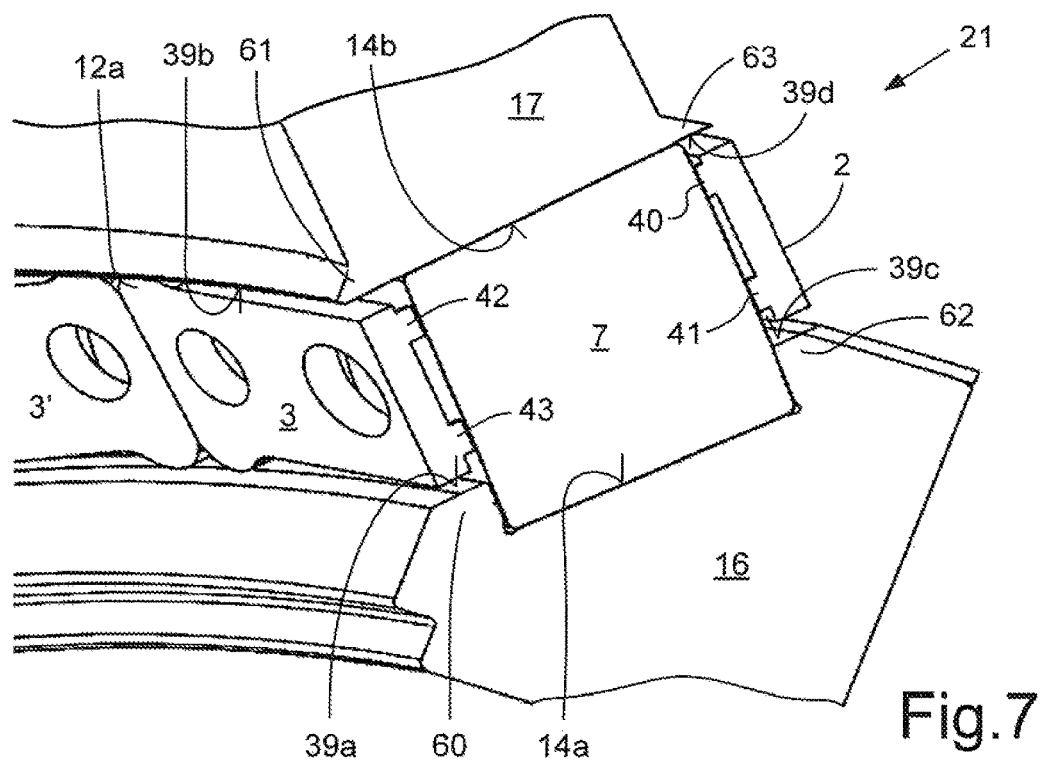

In FIGS. 5, 6, and 7, circumferential sections of a rolling bearing 21 are shown, in which it can be seen that a cage 22 is formed in a rolling bearing 21 by the arrangement of multiple cage segments 1, 1', 1" in the circumferential direction 9 of the rolling bearing 21 one directly after the other. The side plates 2, 3; 2', 3'; 2", 3" and the connecting pieces 4, 5; 4', 5' of these cage segments 1, 1', 1" here have the just specified, somewhat different reference symbols. The directly adjacent cage segments 1, 1', 1" impact each other directly with their flat end sides 23, 24; 25, 26 pointing in the circumferential direction 9 of the rolling bearing 21. In this way, an assembled pocket 10, 11'; 11, 10' is formed from two end-side half pockets of two directly adjacent cage segments 1, 1', 1". If all cage segments 1, 1', 1" of a rolling bearing cage 22 are lined up in a block, these form an axially supporting side edge under use of the rolling bodies 7, 7', 7" held in the half pockets 10, 11'; 11, 10'. The rolling bodies 7, 7', 7" here act like connecting means between the directly adjacent cage segments 1, 1', 1". The end sides 23, 24' 25, 26 of the side plates 2, 3 can also have a convex bulge, especially for use in rolling bearings with comparatively small diameters.

Figure 3:
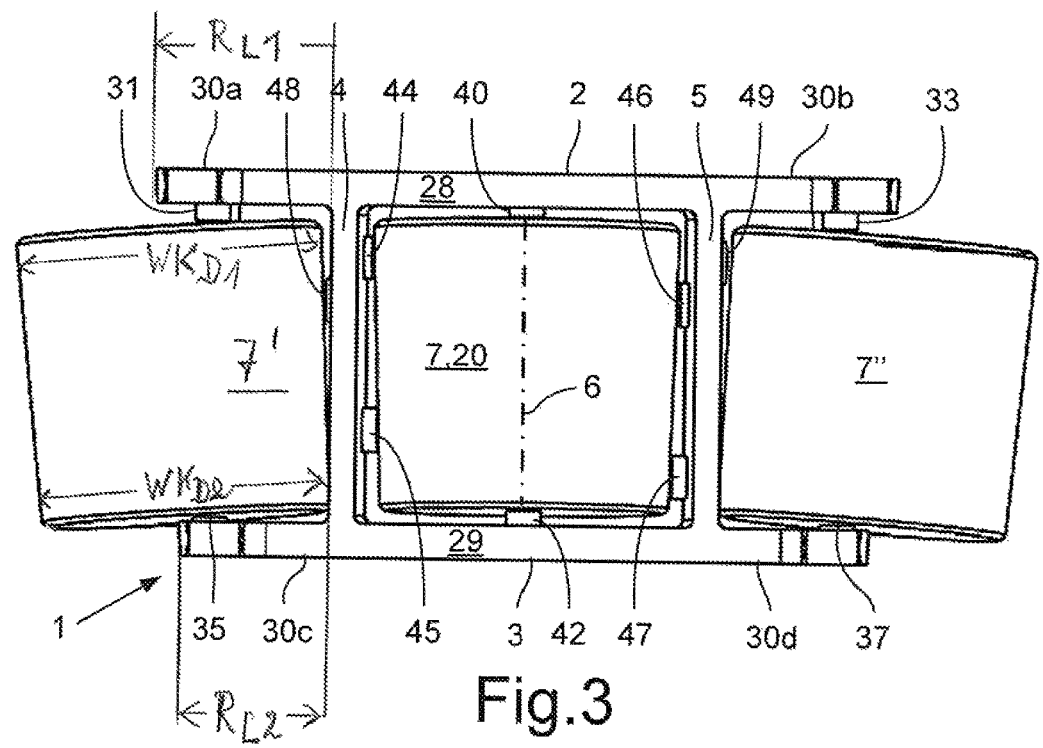
Figure 4:
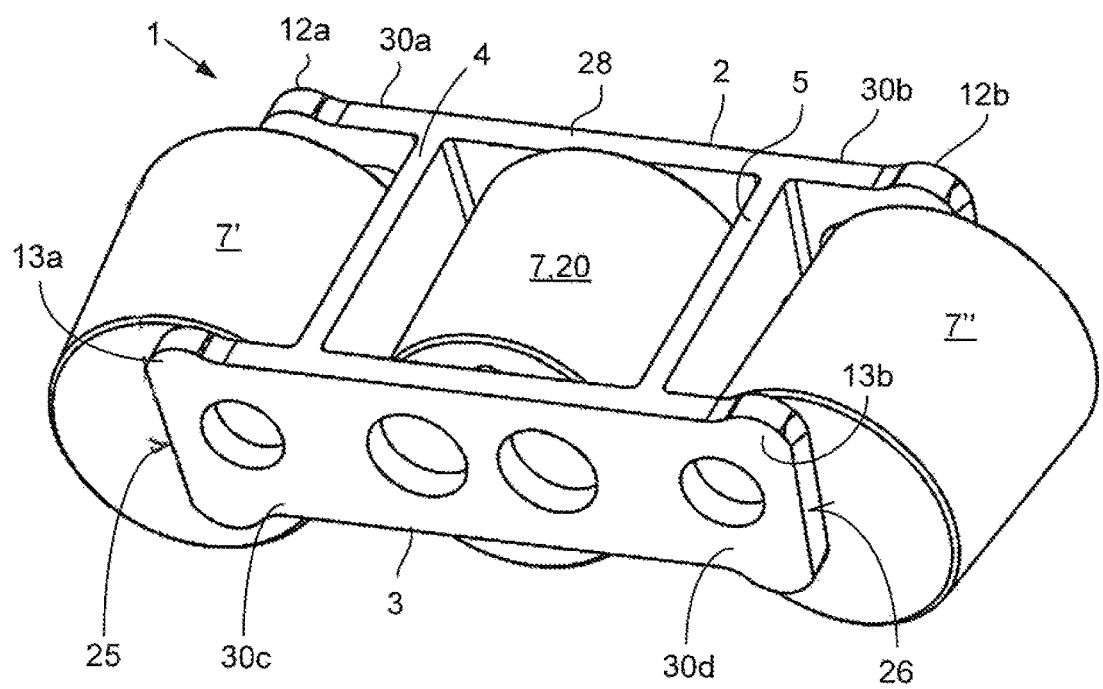

In FIGS. 3 and 4, it can be seen very well how a cage segment 1 formed according to the invention is filled with three tapered sectional rolling bodies 7, 7', 7". Here, FIG. 3 shows very clearly the different arrangement and length of the pocket-side and half pocket-side projections 31, 33, 35, 37, 40, 42, 44, 45, 46, 47, 48, 49 on which the respective rolling bodies 7, 7', 7" contact the whole pocket 8 and the two half pockets 10, 11. In addition, in FIG. 3 it can be seen that the connecting pieces 4, 5 are arranged essentially parallel to the axes of rotation 6 of the rolling bodies 7, 7', 7".

In the axial section of FIG. 7 it can be clearly seen that a radially inner raceway 14a is formed on the inner ring 16 of the rolling bearing 21 between two radial rims 60, 62. The two rims 60, 62 have, on the radial outside, the already mentioned ring surfaces 39a, 39c for the radially inner guidance of the side plates 2, 3. The outer ring 17 provides, in contrast, the already mentioned radially outer raceway 14b for the tapered sectional rolling bodies 7, 7', 7", which has axially on two sides, two extensions 61, 63, on which the ring surfaces 39b, 39d are formed for the radially outer support of the side plates 2, 3.

Figure 8:
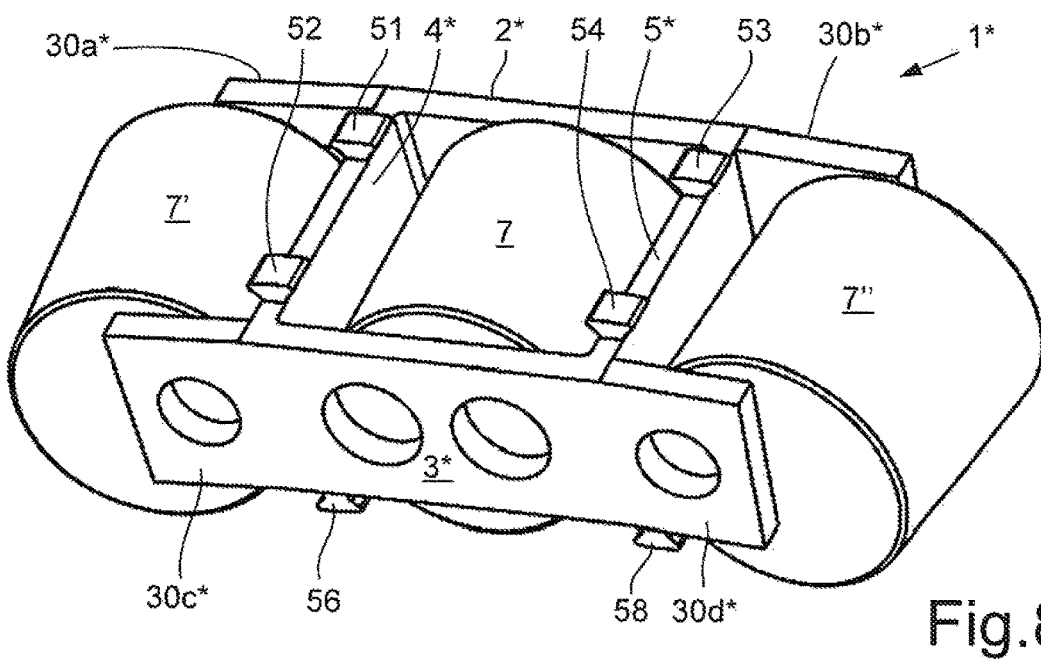
Figure 9:
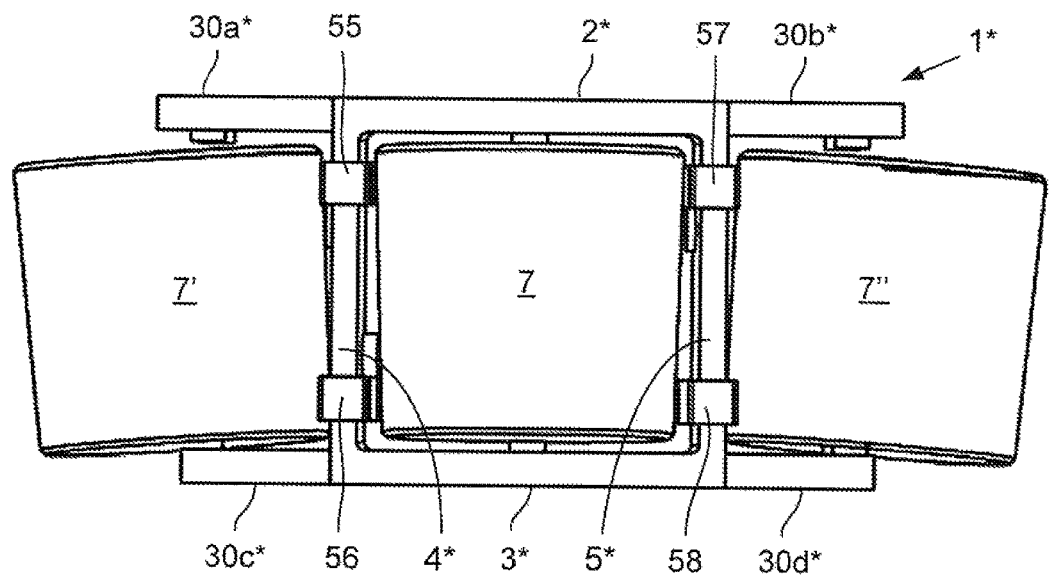
Figure 10:
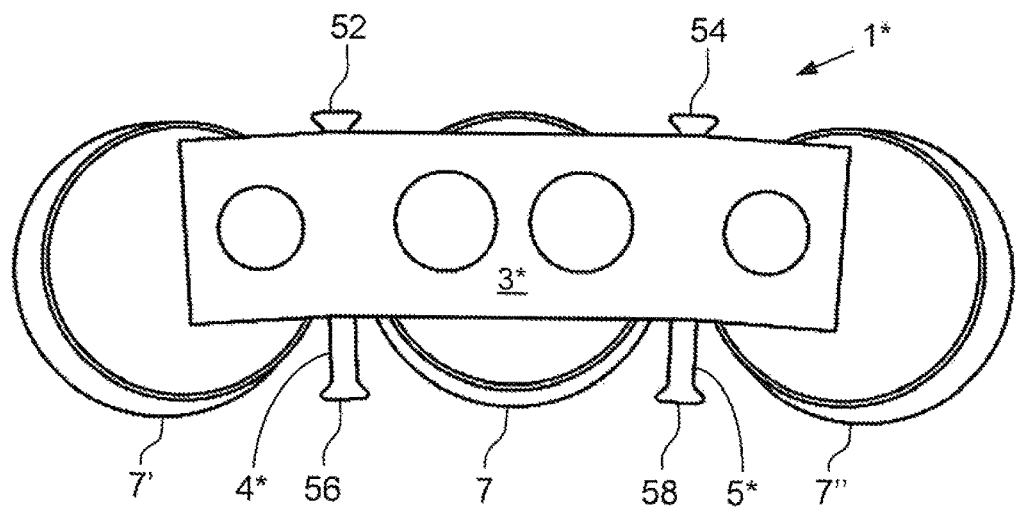
Figure 11:
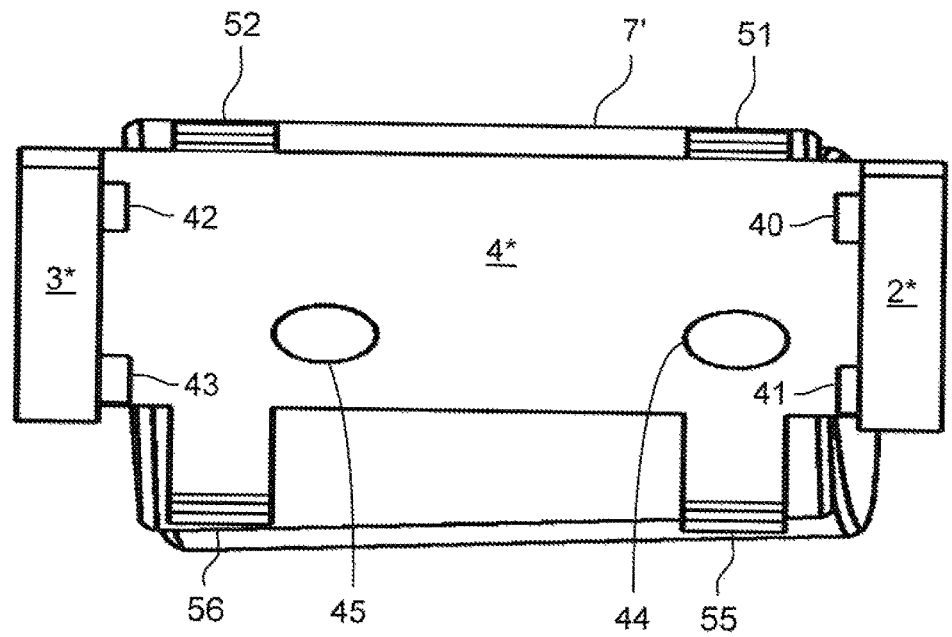
Figure 12:
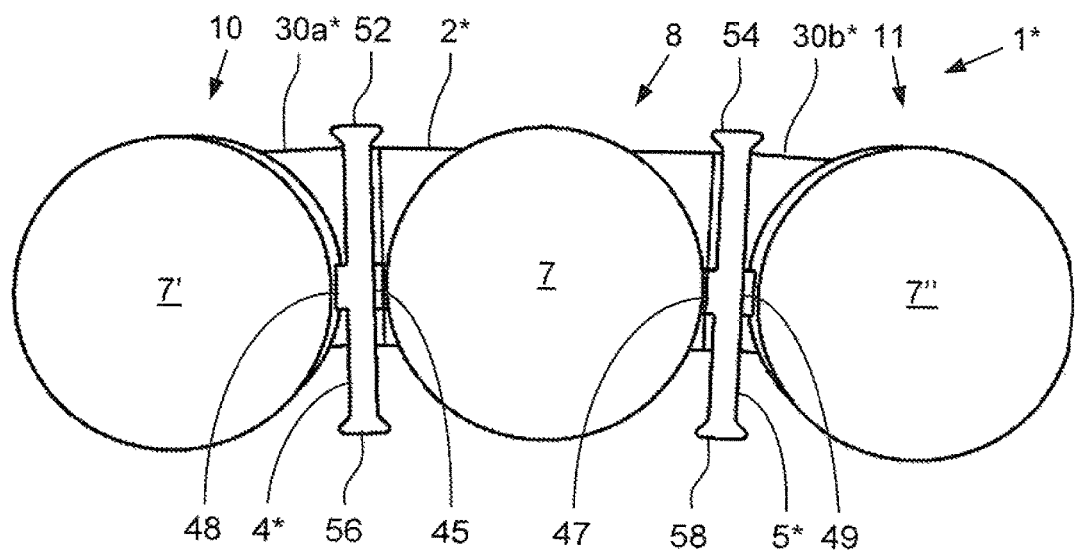

In the second embodiment of a cage segment 1* formed according to the features of the invention and shown in FIGS. 8 to 12, on the two side plates 2*, 3* there are no radial recesses on their radially inner and outer sides, but there are holes for lubricant passage already mentioned in connection with the first embodiment. The cage segment 1* is formed from a four-sided, middle plate structure and free legs 30a*, 30b*; 30c*, 30d* arranged thereon. The four-sided plate structure consists of the two side plates 2*, 3* and two plate-shaped connecting pieces 4*, 5*. The free legs 30a*, 30b*; 30c*, 30d* are also plate-shaped and welded to the four-sided plate structure, wherein the free legs 30a*, 30b*; 30c*, 30d* point in the circumferential direction 9 of a rolling bearing 21. The cage segment 1* according to FIGS. 8 to 12 is guided on the raceways 14a, 14b of the two bearing rings 16, 17 of the rolling bearing 21. In this way, the cage segment 1* has on the radial outer side (FIG. 8) and on the radial inner side of the two connecting pieces 4*, 5*, two radial guide surfaces 51, 52, 53, 53, 54, 55, 56, 57, 58 that form a radially supporting contact in the installed state of the cage segment 1* on the associated raceways 14a, 14b of the inner ring 16 and outer ring 17, respectively. FIG. 8 shows, for explanation, the radial top side and FIG. 9 the radial bottom side of such a cage segment 1*.

Also, for this second embodiment of a cage segment 1* with the features of the invention, this has one whole pocket 8 and two half pockets 10, 11 for holding rolling bodies 7, 7', 7" that have, in this case, a similarly tapered sectional shape. Projections 31, 33, 35, 37, 40, 42, 44, 45, 46, 47, 48, 49 extend into the whole pocket 8 and into the two half pockets 10, 11 with the same or similar geometry and number as in the cage segments 1 according to FIGS. 1 to 7. The two cage segments 1, 1* of the two embodiments differ from each other essentially by the type of guidance of these segments on the two bearing rings 16, 17.

LIST OF REFERENCE SYMBOLS 1, 1* Cage segment
1', 1" Adjacent cage segment
2, 2* First side plate
2', 2" Adjacent first side plate
3, 3* Second side plate
3', 3" Adjacent second side plate
4, 4* First connecting piece
4', 4" Adjacent first connecting piece
5, 5* Second connecting piece
5', 5" Adjacent second connecting piece
6 Axis of rotation of the rolling body
7, 7', 7" Rolling body
8 Pocket
9 Circumferential direction of the rolling body
10, 10' First half pocket of a cage segment
11, 11' Second half pocket of a cage segment
12a, 12b Guide elements on the first side plate
13a, 13b Guide elements on the second side plate
14a Raceway on the inner ring
14b Raceway on the outer ring
15 Wall thickness of a side plate
16 Inner ring
17 Outer ring
18a, 18b Holes in the first side plate
18c, 18d Holes in the first side plate 19a, 19b Holes in the second side plate
19c, 19d Holes in the second side plate
20 Tapered roller
21 Tapered roller bearing, rolling bearing
22 Cage
23 First end side of the first side plate
24 Second end side of the first side plate
25 First end side of the second side plate
26 Second end side of the second side plate
27 Axial direction of the rolling bearing and the cage
28 Radial recess on the first side plate
29 Radial recess on the second side plate
30 Rim on the inner ring
30a, 30a* First free leg on the first side plate
30b, 30b* Second free leg on the first side plate
30c, 30c* First free leg on the second side plate
30d, 30d* Second free leg on the second side plate
31 Half pocket-side projection on the first side plate
32 Half pocket-side projection on the first side plate
33 Half pocket-side projection on the first side plate
34 Half pocket-side projection on the first side plate
35 Half pocket-side projection on the second side plate
36 Half pocket-side projection on the second side plate
37 Half pocket-side projection on the second side plate
38 Half pocket-side projection on the second side plate
39a, 39c Ring surfaces on the inner ring for side plates
39b, 39d Ring surfaces on the outer ring for side plates
40, 41 Pocket-side projections on the first side plate
42, 43 Pocket-side projections on the second side plate
44, 45 Pocket-side projections on the first connecting piece
46, 47 Pocket-side projections on the second connecting piece
48 Half pocket-side projection on the first connecting piece
49 Half pocket-side projection on the second connecting piece
50 Wall thickness of the connecting pieces
51 First guide surface on the first connecting piece 4*
52 Second guide surface on the first connecting piece 4*
53 First guide surface on the second connecting piece 5*
54 Second guide surface on the second connecting piece 5*
55 Third guide surface on the first connecting piece 4*
56 Fourth guide surface on the first connecting piece 4*
57 Third guide surface on the second connecting piece 5*
58 Fourth guide surface on the second connecting piece 5*
60 First rim on the inner ring
61 First extension on the outer ring
62 Second rim on the inner ring
63 Second extension on the outer ring
$WK_D$ Rolling body diameter
$R_L$ Protruding length

The invention claimed is:

1. A cage segment of a rolling bearing, the cage segment comprising:
   two side plates and two connecting pieces that are connected rigidly to each other,
   the connecting pieces being adapted to extend parallel to an axis of rotation of a rolling body of the rolling bearing,
   the side plates and the connecting pieces form a pocket that is adapted to hold a rolling body,
   the two side plates extend on both sides of the pocket in a direction that is adapted to be a circumferential direction of the rolling bearing with a free protruding length $R_L > \frac{1}{2} WK_D$ so far that the side plates form, together with one of the two connecting pieces, a half pocket on each end for holding a directly adjacent rolling body, and $WK_D$ is adapted to correspond to a diameter of the rolling body inserted into the half pocket.

2. The cage segment according to claim 1, wherein several of said cage segments are arranged one directly behind the other in a circumferential direction for forming a cage for the rolling bearing, and
   the two half pockets of one of the cage segments each form a whole pocket together with a corresponding adjacent one of the half pockets of directly adjacent ones of the cage segments.

3. The cage segment according to claim 2, wherein each of the two half pockets of each said cage segment has an essentially U-shaped geometry in a radial view,
   two directly adjacent half pockets are constructed of two directly adjacent ones of the cage segments for holding a tapered roller of a tapered roller bearing,
   and two U-legs of a first said side plate are longer than two U-legs of a second said side plate.

4. The cage segment according to claim 1, wherein the side plates have guide elements that project at least one of radially outward or radially inward and are constructed as rounded sliding surfaces that are adapted for support on a ring surface of an inner ring or outer ring of the rolling bearing.

5. The cage segment according to claim 1, wherein at least one of the side plates or the connecting pieces have lubricant feeds that are constructed as holes or radial recesses, and
   each of the side plates has at least one of said holes in an area of two end-side free legs of the half pockets.

6. The cage segment according to claim 1, wherein dimensions of the pocket and of the two half pockets are configured such that the rolling bodies are each adapted to be arranged therein with pocket clearance.

7. The cage segment according to claim 1, wherein axially extending projections, with end-side contact surfaces for the rolling bodies to be held in the respective pocket or half pocket are constructed on at least one of pocket-side or half pocket-side surfaces of at least one of the side plates or the connecting pieces.

8. The cage segment according to claim 7, wherein each of the projections on the at least one of the pocket-side or half pocket-side surfaces of the at least one of the side plates or the connecting pieces as a function of a geometry and a provided pocket clearance in the respective pocket and half pockets has at least one of equal or different extents or is arranged at different locations with respect to an opposite one of the surfaces of the cage segment.

9. The cage segment according to claim 1, wherein the connecting pieces each have, on radial ends thereof, at least one radially projecting guide surface,
   and a radial distance of two radially opposite guide surfaces is adapted to be a same size or somewhat smaller than a diameter of the rolling bodies held in the cage segment,
   so that the cage segment is adapted to be guided radially by the guide surfaces on a raceway of an inner ring and a raceway of an outer ring of the rolling bearing.

10. A rolling bearing with a cage, the cage comprising a plurality of cage segments according to claim 1,
    an outer ring arranged coaxially above an inner ring and rolling bodies arranged radially in between, wherein each said rolling body is held in one said pocket of one of the cage segments, each directly adjacent said rolling body is held in two of the half pockets of two directly adjacent ones of the cage segments, and the cage segments are arranged directly one behind the other viewed in the circumferential direction of the rolling bearing.

11. The rolling bearing according to claim 10, wherein all of the cage segments forming the cage contact each other on end sides thereof pointing in the circumferential direction of the rolling bearing.

12. A rolling bearing comprising:

an outer ring arranged coaxially above an inner ring and rolling bodies arranged radially therebetween;

a cage comprised of a plurality of cage segments, each said cage segment including:

two side plates and two connecting pieces that are connected rigidly to each other and define a pocket, the connecting pieces extending parallel to an axis of rotation of said one of the rolling bodies located in said pocket, the two side plates extend on both sides of the pocket in a circumferential direction of the rolling bearing with a free protruding length on each side such that the side plates form, together with one of the two connecting pieces, a U-shaped half pocket on each end for holding one of the rolling bodies located between adjacent ones of the cage segments; and the cage segments are arranged directly one behind the other viewed in the circumferential direction of the rolling bearing.

13. The rolling bearing of claim 12, wherein the free protruding length corresponds to $R_L > \frac{1}{2} WK_D$ where $WK_D$ equals a diameter of one of the rolling bodies inserted into the half pocket.

14. The rolling bearing of claim 12, wherein the rolling bodies are tapered, and two U-legs of a first one of the side plates are longer than two U-legs of a second one of the side plates.

15. The rolling bearing of claim 12, wherein the side plates have guide elements that project at least one of radially outward or radially inward and are constructed as rounded sliding surfaces that are supported on a ring surface of the inner ring or the outer ring.

16. The rolling bearing of claim 12, further comprising axially extending projections with end-side contact surfaces are constructed on at least one of pocket-side or half pocket-side surfaces of at least one of the side plates or the connecting pieces, and the end-side contact surfaces contact the rolling bodies in the respective pockets or the half pockets.

17. The rolling bearing of claim 12, wherein dimensions of the pockets and of the two half pockets are configured such that the rolling bodies are each arranged therein with pocket clearance.

\* \* \* \* \*